United States Patent [19]
Falik et al.

[11] Patent Number: 5,964,853
[45] Date of Patent: Oct. 12, 1999

[54] INTERFACE CONTROLLER INCLUDING HARDWARE MECHANISM TO HANDLE PS/2 INTERFACE

[75] Inventors: Ohad Falik, Kfar Saba; Yehezkel Friedman, Ramat Hasharon; Mishael Agami; Zeev Bikowski, both of Ramat Poleg, all of Israel; Ziv Azmanov, Cupertino, Calif.

[73] Assignee: National Semiconductor Corp., Santa Clara, Calif.

[21] Appl. No.: 08/813,501

[22] Filed: Mar. 7, 1997

[51] Int. Cl.⁶ .............................. G06F 13/00; G06F 13/14; H01J 3/00
[52] U.S. Cl. .................................. 710/73; 710/5; 710/49
[58] Field of Search ................................. 395/869, 275; 364/926.9, 926.93, 947.5; 712/1; 710/5, 73, 49

[56] References Cited

U.S. PATENT DOCUMENTS 5,381,530  1/1995  Thayer et al. ........................ 395/275
5,608,889  3/1997  Werlinger et al. ................. 395/421.07

OTHER PUBLICATIONS

PC87570 Keyboard and Power Management Controller, National Semiconductor, rev. 1.00, Oct. 1996.

Primary Examiner—Ayaz R. Sheikh
Assistant Examiner—Tim T. Vo
Attorney, Agent, or Firm—Limbach & Limbach L.L.P.

[57] ABSTRACT

A controller handles host commands from a host processor and also interfaces the host processor to a serial device. Storage circuitry (e.g., a shift register) of the controller holds a predetermined plurality of data bits. State machine circuitry controls the storage circuitry for serial bit-level communication (e.g., using a PS/2 protocol) between the storage circuitry and the serial device. A processor executes code from a program memory. In particular, the program code causes the processor to detect that a host command has been received by the controller from the host processor and causes an action corresponding to the host command received. Because the processor is not involved with the serial bit-level communication between the storage circuitry and the serial device, the processor executing the software can handle host commands without affecting the serial bit-level communication.

25 Claims, 8 Drawing Sheets

FIG. 7 PSDAT ⟶ 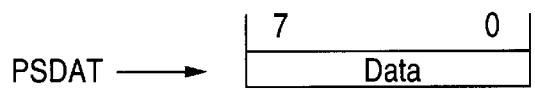
FIG. 8 PSTAT ⟶ 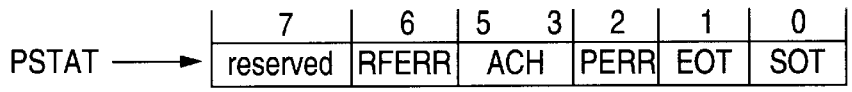
FIG. 9 PSCON 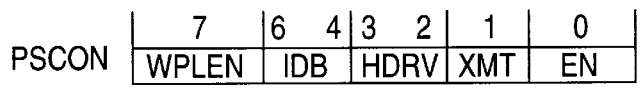
  PSOSIG
  PSISIG
  PSIEN

INTERFACE CONTROLLER INCLUDING HARDWARE MECHANISM TO HANDLE PS/2 INTERFACE

TECHNICAL FIELD

The present invention relates to a method and apparatus for implementing the FORCE-A20 and CPU-RESET commands and interface communications with external devices, such as keyboards, tracking devices and smart power management circuitry, such that the FORCE-A20 and CPU-RESET commands do not unduly interfere with the handling of the interface communications.

BACKGROUND

The FORCE-A20 signal is well-known in the art as a signal (typically provided from an output pin of an 8042 keyboard controller) for forcing low the A20 address line of an advanced "host" microprocessor (e.g., an 80286 or 80386 microprocessor) in response to a command from the advanced host microprocessor. As such, the advanced host microprocessor can execute (in real mode) software written to be executed by a less advanced, 8086, microprocessor.

In particular, the address space of the 8086 microprocessor is limited address to being addressed by twenty address lines (i.e., A0–A19) while the advanced microprocessor has more than twenty address lines. By forcing the A20 address line of the advanced microprocessor low, the advanced microprocessor can simulate the "wrap-around" feature employed by some 8086 software. The "wrap-around" feature is discussed in detail in the background portion of U.S. Pat. No. 5,381,530 to Thayer et al. (issued Jan. 10, 1995) and hereby incorporated by reference in its entirety.

In addition, the RESET-CPU signal is well-known in the art as a signal also provided from an output pin of a keyboard controller for addressing the reset input of an advanced microprocessor. This allows the advanced microprocessor to switch from switch from "protected mode" to "real mode". This is also discussed in the background portion of U.S. Pat. No. 5,381,530.

A problem with employing a keyboard controller to implement the FORCE-A20 and RESET-CPU commands is that the keyboard controller's primary function is to control communication with external input/output devices, and the FORCE-A20 and RESET-CPU commands should be handled without affecting this communication. For example, the keyboard controller may communicate with external devices via a "PS/2 protocol". (In addition, the keyboard controller may provide an interface to other devices such as a "smart battery" via a power management bus.) Significantly, if a PS/2 protocol data packet transfer is interrupted (e.g., in the prior art by a command being received by the keyboard controller from the host processor), the data transfer must be re-initiated from the beginning. This is illustrated in FIG. 1-1. Ideally, a 1–2 ms uninterrupted time period is required to properly service a PS/2 transfer. In addition, as host processors become faster, the period between FORCE-A20 commands shrinks, further shrinking the uninterrupted periods available to the keyboard controller to properly service PS/2 transfers.

If the external input/output device is a mouse and the communication with the mouse is interrupted for too long a period, this could result in mouse "sticking" or "jumping". On the other hand, the keyboard controller must handle the FORCE-A20 and RESET-CPU commands in a timely manner since the host processor cannot continue processing after a FORCE-A20 or RESET-CPU command has been issued until the keyboard controller has actually handled the command by asserting the appropriate output.

SUMMARY

In accordance with the invention, a controller is provided that handles host commands from a host processor and that also interfaces the host processor to a serial device. A processor executes code from a program memory. In particular, the program code causes the processor to detect that a host command has been received by the controller from the host processor and causes an action corresponding to the host command received.

Storage circuitry (e.g., a shift register) of the controller holds a predetermined plurality of data bits. State machine circuitry controls the storage circuitry for serial bit-level communication (e.g., using a PS/2 protocol) between the storage circuitry and the serial device.

Because the processor is not involved with the serial bit-level communication between the storage circuitry and the serial device, the processor executing the software can handle host commands without interrupting the serial bit-level communication. In other words, the bit-level communication can be handled without sensitivity to CPU interrupts or handling latency. This is illustrated in FIG. 1-2.

BRIEF DESCRIPTION OF THE DRAWINGS

FIG. 1-2 illustrates how a controller in accordance with the invention addresses the shortcoming of the prior art keyboard controllers.

FIG. 1 illustrates, in block form, an embodiment of a controller circuit in accordance with the invention.

FIG. 1-3 illustrates a pinout of an integrated circuit which may embody the controller circuit.

FIG. 1-4 illustrates an architecture of the FIG. 1-3 integrated circuit.

FIG. 1-5 illustrates an embodiment of the host interface of the FIG. 1 controller circuit.

FIG. 2 is a flowchart illustrating the process 200 of the firmware 102, in accordance with a preferred embodiment of the invention, for handling commands from the host processor.

FIG. 3 illustrates details of a PS/2 interface circuit 300, as an embodiment of the hardware circuit 105 of FIG. 1.

FIG. 4 illustrates an embodiment of the quasi-bidirectional buffer of the PS/2 interface circuit, for one channel, of the FIG. 3 PS/2 interface circuit.

FIG. 5 illustrates an interrupt driven scheme utilized by the firmware of FIG. 1 to implement the FIG. 3 PS/2 interface circuit.

FIG. 7 illustrates the PSDAT register.

FIG. 8 illustrates the PSTAT register.

FIG. 9 illustrates the PSCON register.

DETAILED DESCRIPTION

Figure 1:
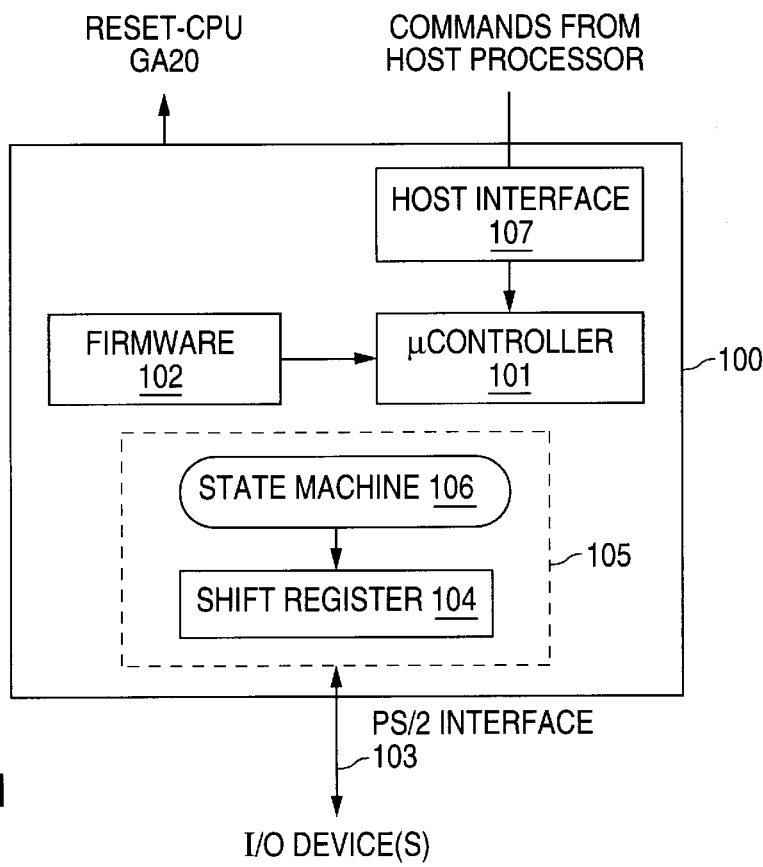
FIG. 1-1 illustrates a shortcoming of prior art keyboard controllers.
Figure 1:
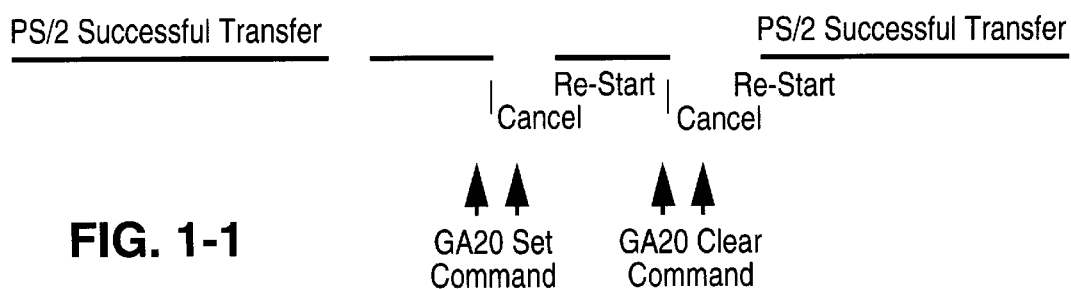

A block diagram of an embodiment of a controller circuit 100 in accordance with the invention is shown in FIG. 1.

Commands from a host processor (e.g., as discussed above in the Background, an 80286 or 80386 microprocessor) are handled by a control processor 101 executing firmware (or software) stored in a memory 102 (e.g., ROM, RAM or flash). The commands are provided from the host processor via a host interface 107. The memory 102 may be formed as an integral part of the controller circuit 100. Alternately, the memory 102 may be "off-chip".

A PS/2 interface 103 is provided for interfacing the controller circuit 100 with external input/output devices (not shown). Other interfaces, such as a power management bus using an I²C physical layer, may be provided. Significantly, the controller circuit 100 includes hardware circuitry 105 that inputs complete PS/2 packets without intervention from the control processor 101. This eliminates the time-criticality of the PS/2 packet transfer since the controller circuit 100 can handle commands from the host processor without interrupting PS/2 packet transfer. In a preferred embodiment, the hardware circuitry includes a shift register 104, and a state machine 106 that controls the input of data from the I/O device into the shift register 104.

Figures 1, 2:
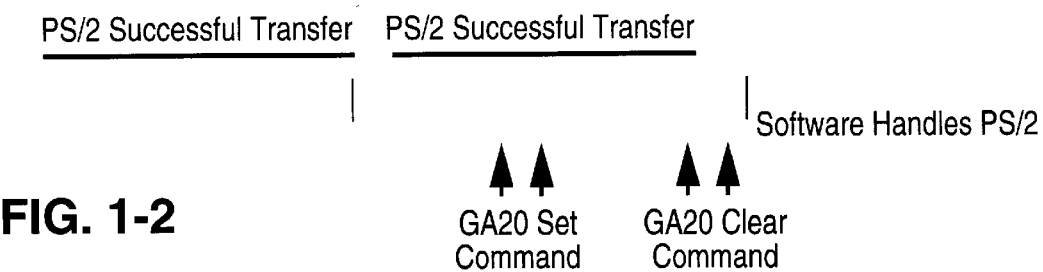
Figures 1, 2, 3:
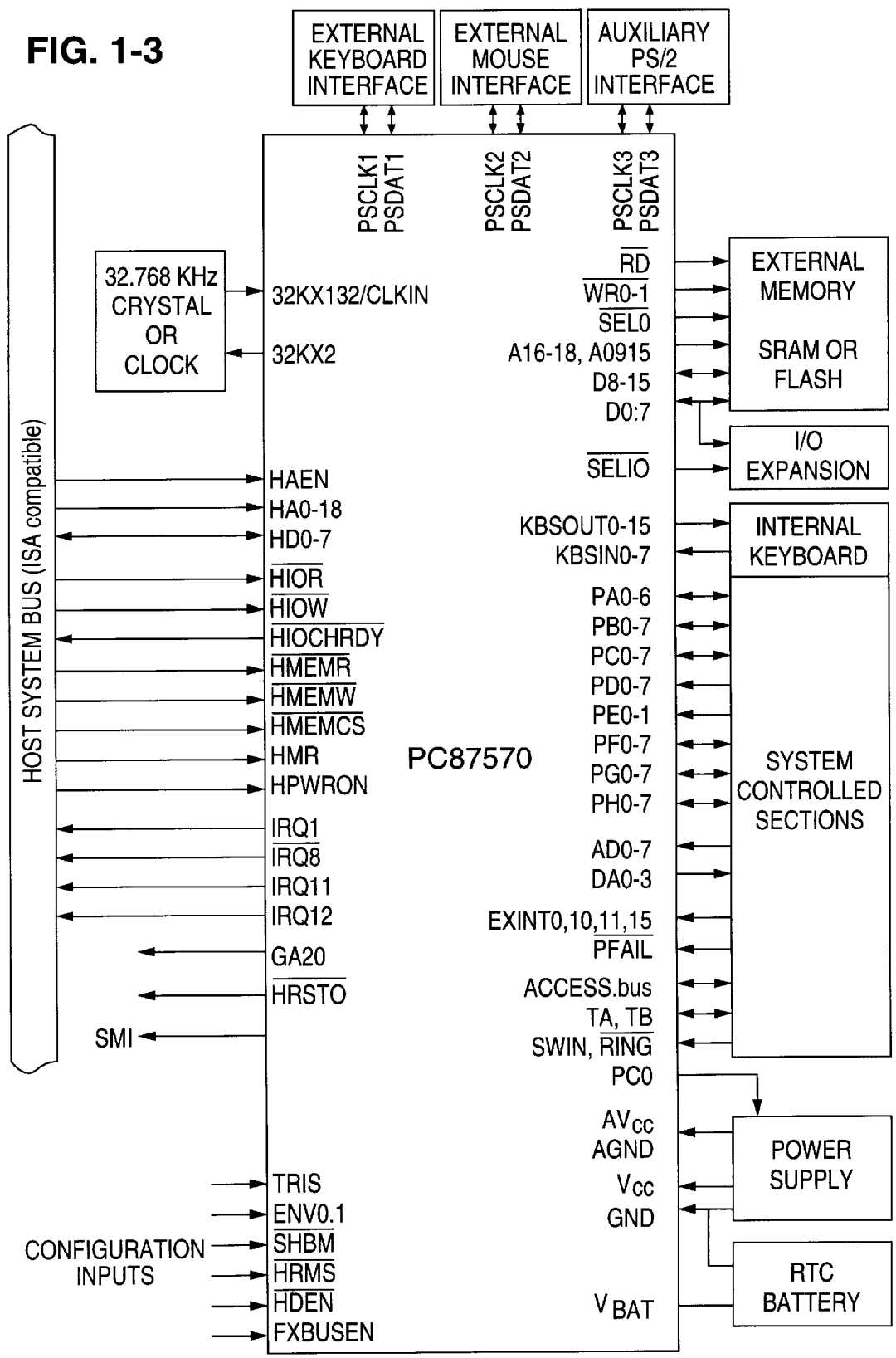

FIG. 1-3 illustrates a pin-out of an integrated circuit into which the controller circuit 100 may be embodied. FIG. 1-4 illustrates an architecture of the FIG. 1-3 integrated circuit. The GA20 and RESET-CPU signals are driven via an output of the integrated circuit shown in FIG. 1-3 and 1-4. This output is controlled via a bit in a register accessible by the controller processor 101 using a general purpose I/O instruction. The GA20 signal output is initialized to be "1" upon reset of the controller circuit 100.

FIG. 1-5 illustrates an embodiment of the host interface 107. The host side of the interface circuit 107 illustrated in FIG. 1-5 is compatible to the legacy 8042 host interface. The processor side provides the same functionality with additional interrupt generation capability. Basically, the host interface circuit 107 illustrated in FIG. 1-5 generates interrupts to the host processor and to the controller processor 101 based upon the status of input and output data buffers.

FIG. 2 is a flowchart illustrating the process 200 of the firmware 102, in accordance with a preferred embodiment of the invention, for handling commands from the host processor. In particular, the FORCE-20 (also called "GA20") and RESET commands are handled by the controller processor 101 before any other commands, thus reducing the latency and overhead in handling these commands. Furthermore, these commands are handled without affecting the PS/2 interface 103.

The process 200 begins at step 202 upon the processor 101 detecting an interrupt indicating that a message byte has been sent from the host processor. This interrupt is generated by the host interface 107. At step 204, it is decided if the message byte is a command byte or a data byte. If the message byte is a command byte, then the process continues at step 206, where it is determined if the command byte is D1 or FF and, thus, part of a GA20 command from the host processor.

If it is determined at step 206 that the command byte is part of a GA20 command from the host processor, then a command "handler" routine, of a plurality of routines 210, is invoked to force low (or high) the A20 line of the host processor. Otherwise, it is determined at step 208 if the command byte is a RESET command. If it is determined at step 208 that the command byte is a RESET command, then a reset handler routine, of the plurality of routines 210, is invoked to strobe the reset input of the host processor.

Otherwise, at step 212, the PS/2 interface is disabled from receiving data messages initiated by the PS/2 device. This may be done, for example, by holding the clocks low. Then, the command is parsed at step 214 and a corresponding one of a plurality of command handlers 216 is invoked to carry out an action corresponding to the command byte. It should be noted that, while the FIG. 2 flowchart illustrates disabling the PS/2 interface at step 212, this is not strictly required for handling all host commands. Rather, it is only required for host commands whose handling requires the PS/2 interface. Thus, in an alternate embodiment, the PS/2 interface is disabled at step 212 only for handling host commands that require the PS/2 interface. For example, if the CAPS LOCK key on an attached keyboard is depressed, a host command will be issued to the controller 100, at step 216, to enable the PS/2 interface for transmission of a command to the keyboard via the controller 100 and to cause the controller to issue a command to the keyboard, via the PS/2 interface, to illuminate the CAPS LOCK indicator. In this case, the controller would disable the PS/2 interface at step 212 from receiving messages from the PS/2 devices. If a PS/2 packet transfer was in progress at the time this host command was being handled, then the PS/2 packet transfer would have to be restarted. However, such host commands are so infrequent that their effect on the overall PS/2 interface performance is negligible. At step 226, the PS/2 interface is enabled if the host command was fully received and includes potential command data, and after guaranteeing that the PS/2 interface has been disabled long enough for the host command using the PS/2 interface to complete. Finally, at step 250, processing is ended with interrupts being enabled.

If the message byte received is determined at step 204 to be a data byte (as opposed to a command byte), processing proceeds at step 218, where it is determined if the software is presently in the process of performing GA20 or RESET handling. (There may be other host commands in addition to the GA20 and RESET-CPU commands that do not require disabling the PS/2 interface.) If so, then a data handler routine 228 is invoked (e.g., for a GA20 command, the data byte may indicate either set or reset) and processing ends at step 250. Again, it is significant that the PS/2 interface 103 is not affected by GA20 or RESET handling. Otherwise, the PS/2 interface 103 is disabled at step 220, the data is parsed at step 222, and a data handling routine is invoked at step 224. Then, processing continues at step 226 and ends at step 250.

A PS/2 interface circuit 300, as the hardware circuit 105, is now described with reference to FIG. 3. The PS/2 interface circuit 300 operates in accordance with the PS/2 standard promulgated by IBM. In the following discussion, "channel" refers to the interface to one "PS/2 device" and its associated "clock" and "data" signals. The PS/2 interface circuit 300 illustrated in FIG. 3 includes a three channel shift mechanism 302; an interface register circuit 304 for controlling data transfer on the three channels; and a quasi-directional buffer circuitry 306 that provides buffering for each channel.

Figures 1, 2, 3, 4:
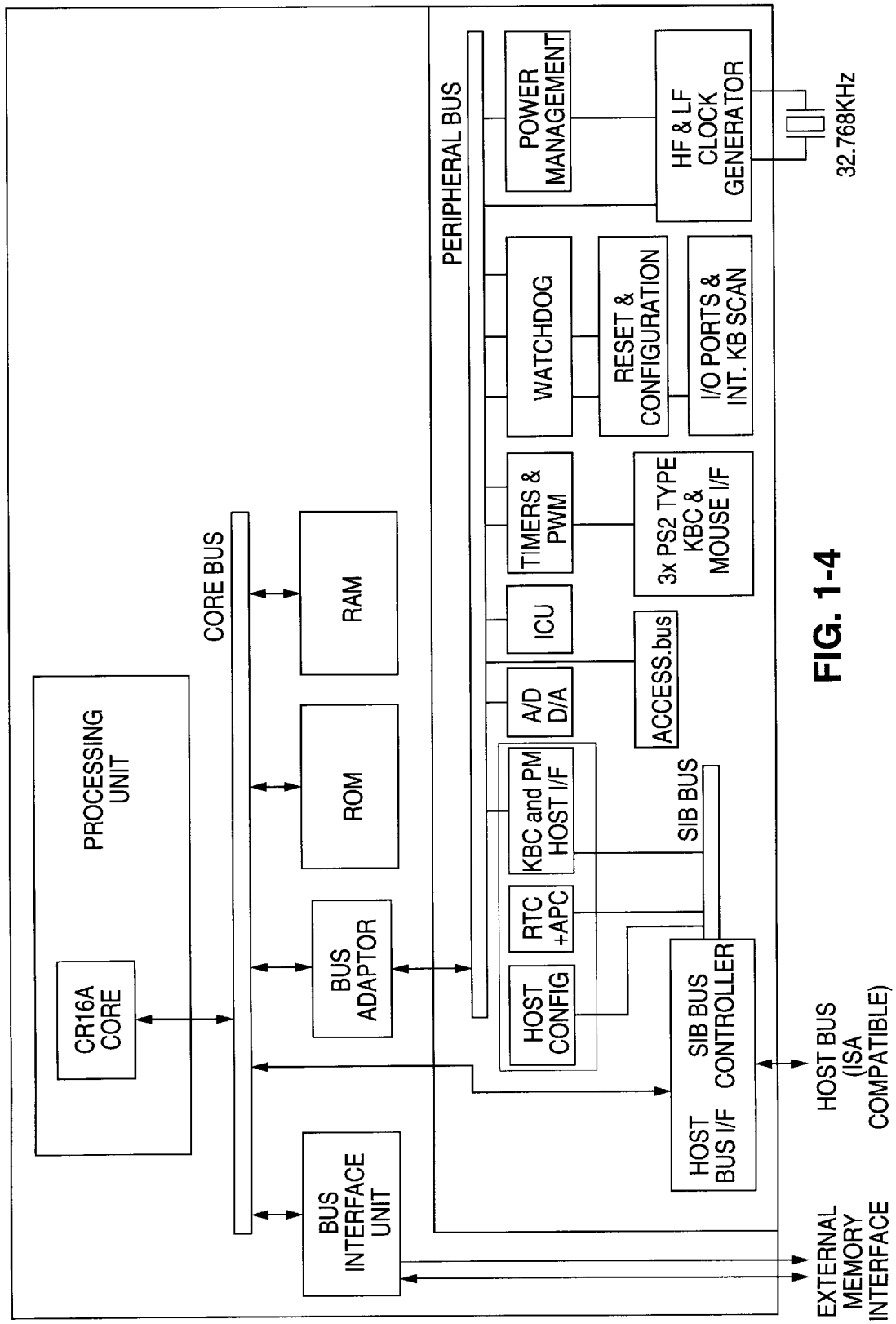

As shown in FIG. 4 for one channel only, the quasi-directional buffer (labelled as 306a, for the one channel shown) has an open drain output (Q2), an internal pull-up (Q3) and a low impedance pull-up (Q1). Open drain output Q2 becomes active, pulling down the output data PDAT1, whenever the output buffer data is low. The weak pull-up (Q3) is active, pulling up the output data PDAT1, whenever the output buffer data is high. The low-impedance pull-up (Q1) is active whenever the output data PDAT1 changes from low to high, thereby reducing the low-to-high transition time. The low impedance pull-up transition time is determined from a field in the control register (discussed later).

Figures 1, 2, 3, 4, 5:
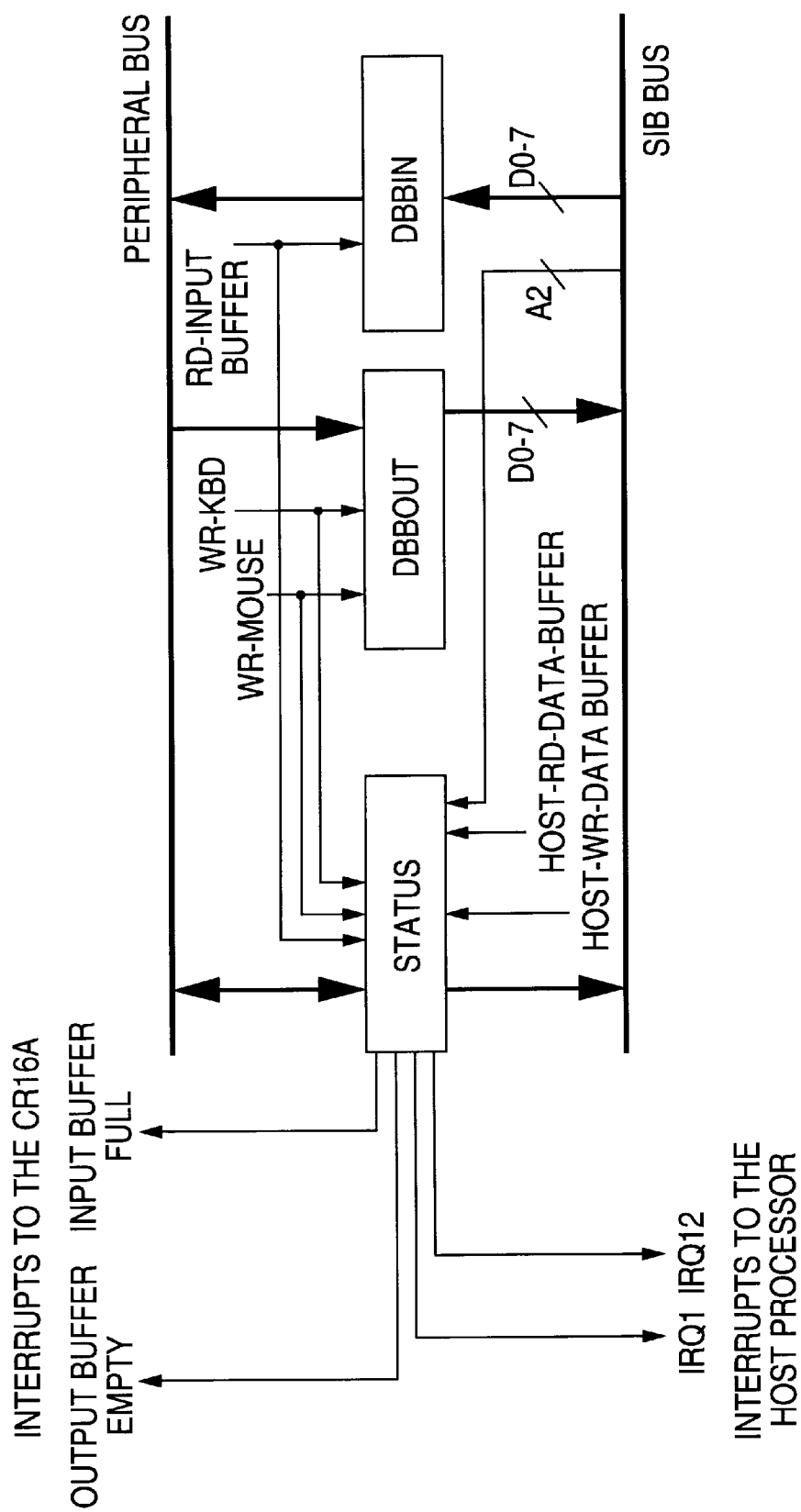
Figure 2:
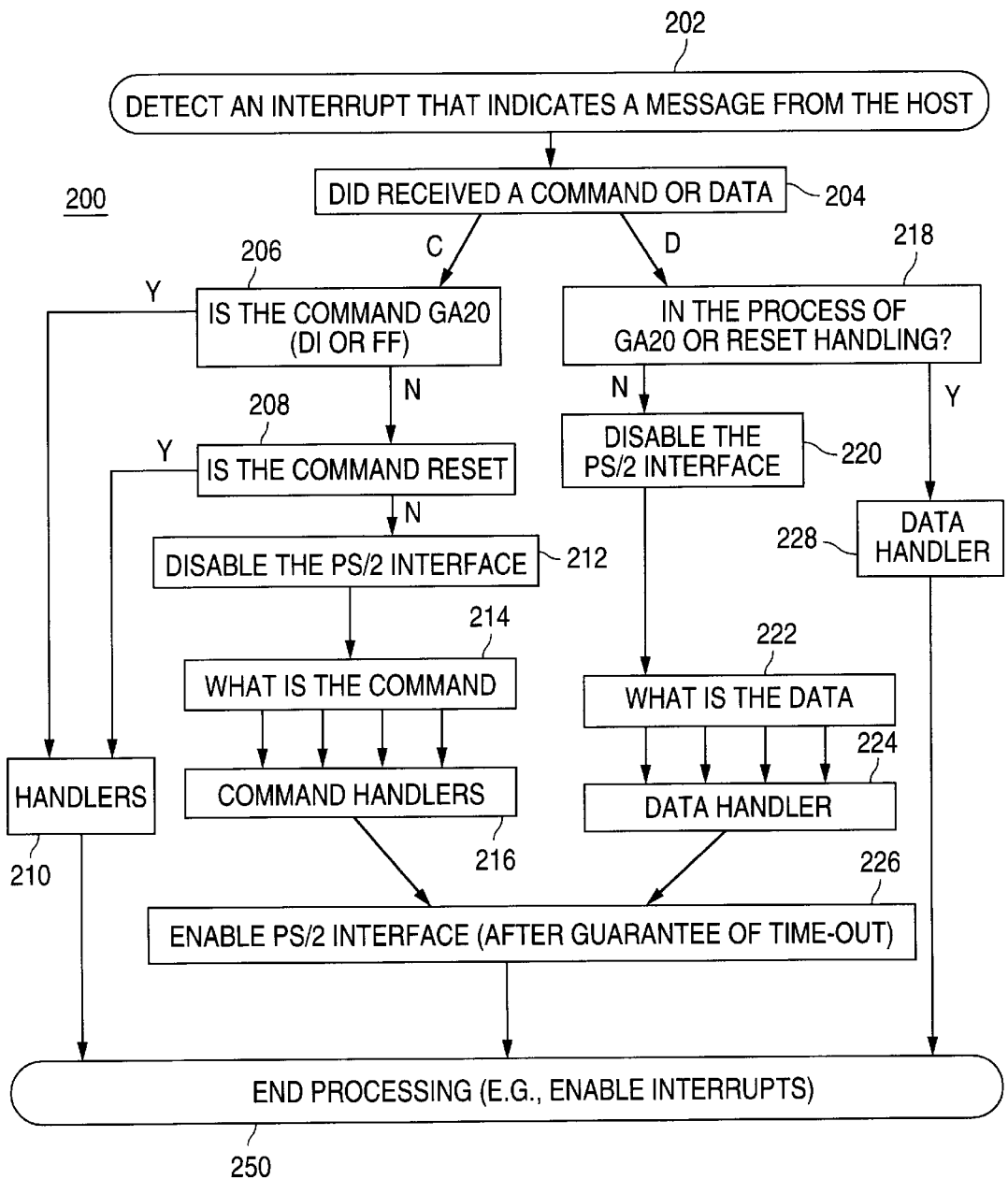
Figure 3:
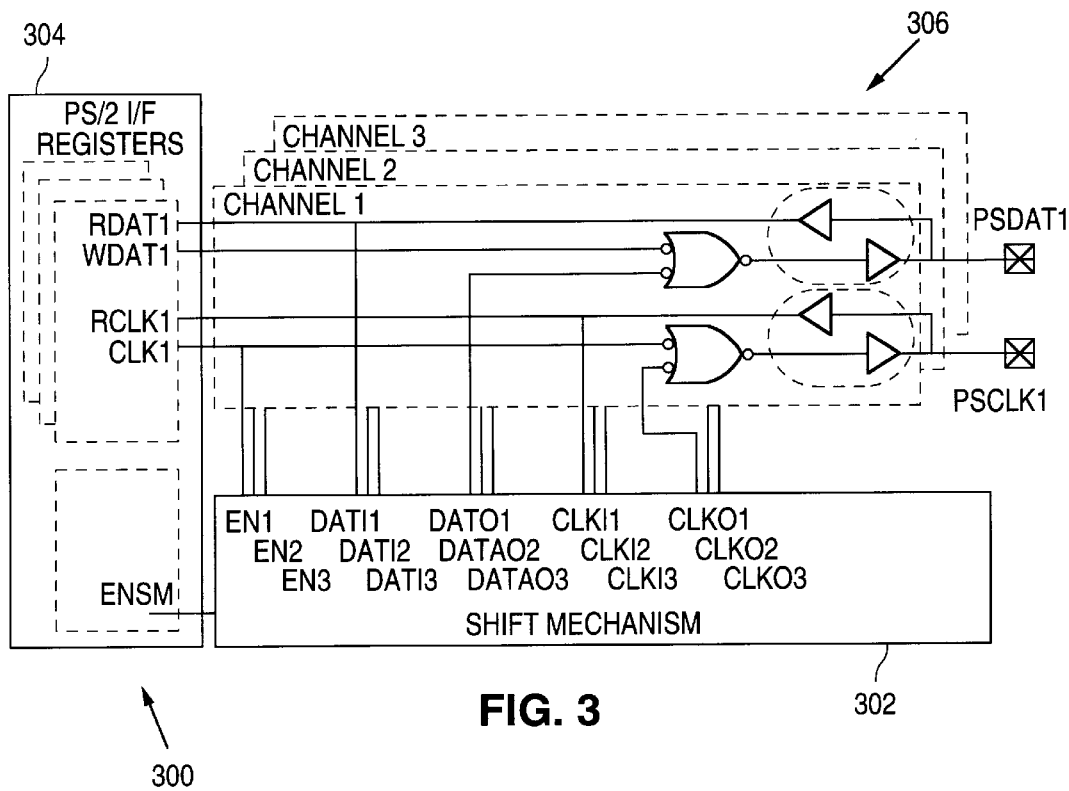
Figure 4:
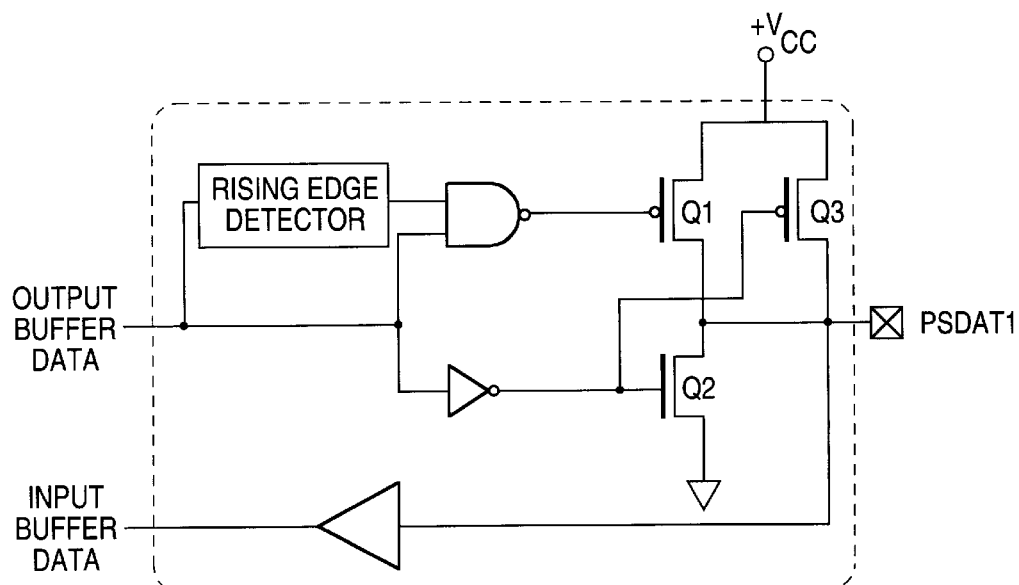
Figure 5:
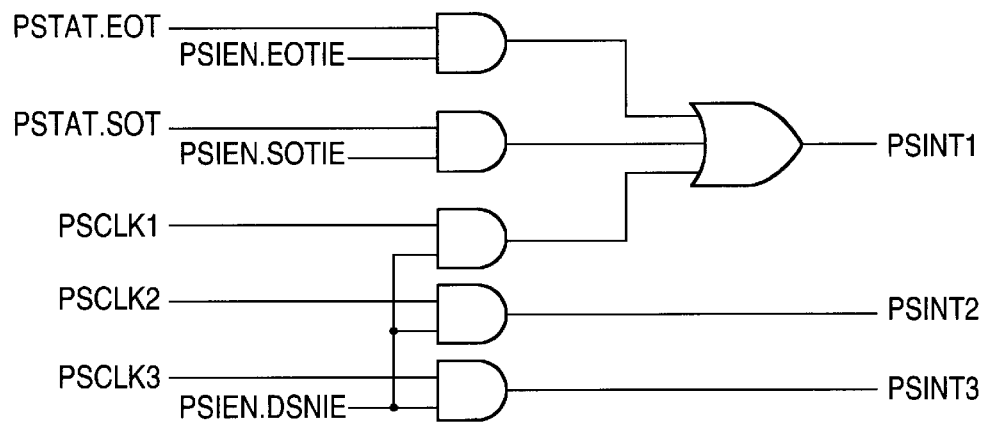

As shown in FIG. 5, the firmware uses an interrupt driven scheme to implement the PS/2 interface circuit 300. When the shift mechanism circuit 302 is not in use, three interrupts are available, one for each channel: PSINT1, PSINT2 and PSINT3. When the shift mechanism circuit 302 is in use, only one interrupt signal (PSINT1) is used. FIG. 5 illustrates how the interrupt signals are generated, including associated "enable" signals.

Figure 6:
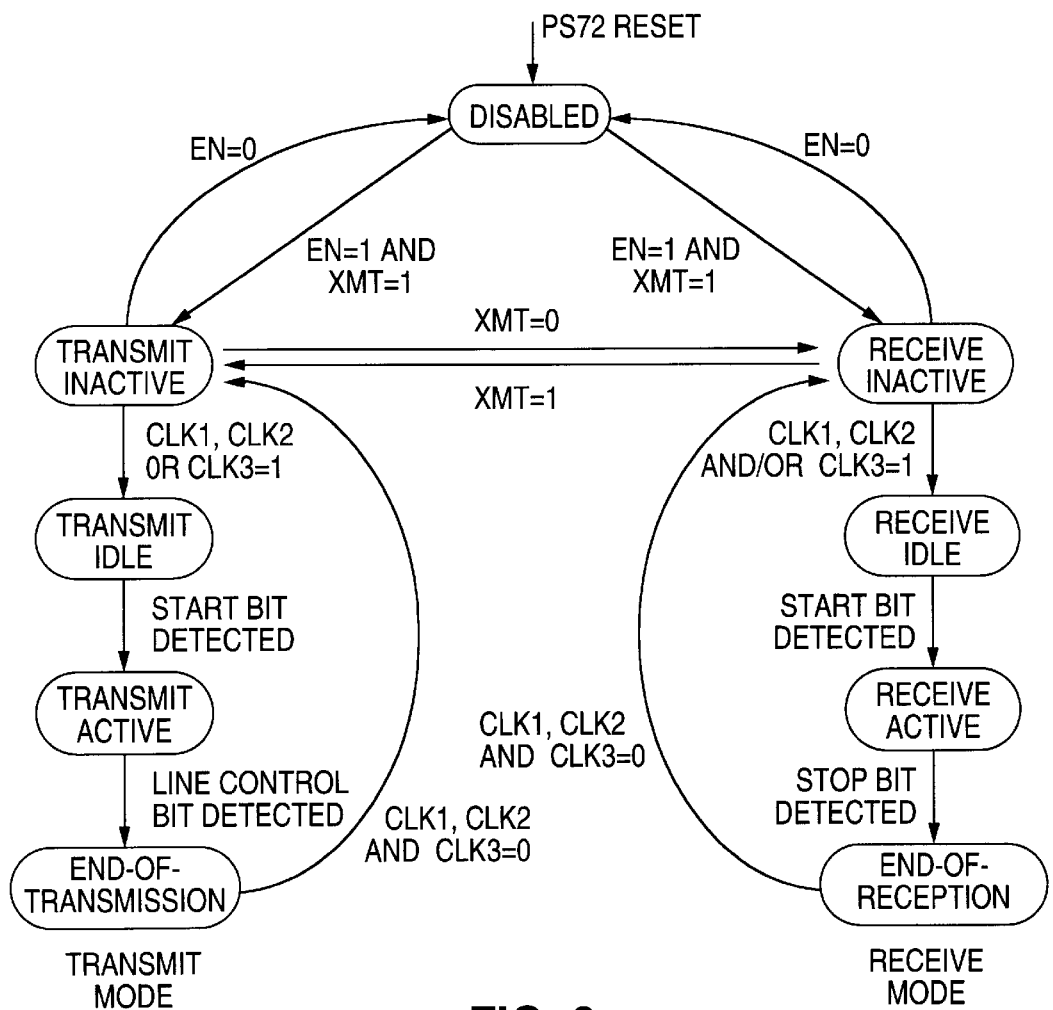
FIG. 6 illustrates a state machine of the data transfer sequence for the PS/2 interface circuit.

As discussed above, the PS/2 interface circuit 300 (and, particularly, the shift mechanism circuit 302) offloads the bit level handling of packet data transfer from the controller 101, executing the firmware 102, to a hardware scheme that operates without intervention from the controller 101, thus improving system tolerance to interrupt latency. FIG. 6 illustrates a state machine of the data transfer sequence. As shown in FIG. 6, the state machine can be in one of three transfer modes: disabled, receive and transit. Different states in each mode define the progress of the data transfer.

The state machine of FIG. 6 will be discussed below. But first, the six registers used to define and control the operation of the PS/2 interface circuit 300 are discussed. As shown in FIG. 7, the PSDAT register is a byte wide, read/write register. PSDAT holds data received in the last message from a corresponding PS/2 device. In transmit mode, the data to be transmitted (i.e., shifted out) to the corresponding PS/2 device is written to the PSDAT register. When the PS/2 interface circuit 300 is reset, the contents of the PSDAT register become invalid. Also, it should be noted that, on reset, the PS/2 interface circuit 300 is set to receive mode. Bit 0 is the first bit to be shifted (i.e., least significant bit).

The PSTAT register, shown in FIG. 8, is a byte wide, read only status register. The PSTAT register contains the status information on data transfer in the PS/2 interface circuit 300 ports. All non-reserved bits of the PSTAT register are cleared to zero on reset of the PS/2 interface circuit 300. The SOT field indicates that a start bit was detected. The ACH field indicates in which of the PS/2 channels the start bit was detected (i.e, which channel is active). In case more than one channel becomes active simultaneously, only the channel with the highest priority (lowest number) is indicated in the ACH field. Thus, "000" indicates that none of the channels is active; "001" indicates that Channel 1 is active; "010" indicates that Channel 2 is active; and "100" indicates that Channel 3 is active".

The EOT field indicates that a stop bit was detected in receive mode or a line control bit was detected in transmit mode. When the EOT field is asserted, this indicates that PS/2 data transfer was completed. The PERR field indicates a parity error; and RFERR indicates a receive frame error (i.e., that a stop bit in a frame was detected low instead of high).

The PSCON register, shown in FIG. 9, is an 8-bit read/write register that controls the operation of the PS/2 interface circuit 300 by enabling each of the channels and controlling the data transfer direction. When the EN field is set, the shift mechanism 302 is enabled. When the shift mechanism is enabled, a de-bounce operation is performed on the clock input signal before determining its logic value. PSCON.IDB determines for how many clock cycles the input signal must be stable to define a change in its value. The enabled channels are controlled by the PSOSIG register (FIG. 10) and the transmit/receive mode is controlled by the XMT bit of the PSCON register. When the EN field is cleared, the shift mechanism circuit is disabled and the firmware 102 may control the PS/2 signals directly, using the PSOSIG register (FIG. 10) and the PSISIG register (FIG. 11).

The XMT field of the PSCON register, when set, causes the PS/2 interface circuit 300 to enter the transmit mode. Otherwise, when the XMT field is cleared, the interface circuit 300 enters the receive mode. The HDRV (high drive) field defines how the quasi-bidirectional buffer (FIG. 4) behaves on the transition from low to high. Specifically, HDRV defines the period of time for which the output PSDAT1 is pulled high with the low impedance drive Q1. This period is a function of the clock. When the HDRV field is "00", the low impedance drive Q1 is disabled. When the HDRV field is 01, the low impedance drive Q1 is active for one clock cycle for each time the output of the quasi-directional buffer is changed from low to high. When the HDRV field is "10", the low impedance drive Q1 is active for two clock cycles for each time the output of the quasi-directional buffer is changed from low to high. Finally, when the HDRV field is "11", the low impedance drive Q1 is active for three clock cycles for each time the output of the quasi-directional buffer is changed from low to high.

The IDB field (input de-bounce) defines the number of times that the clock input is expected to be stable before the shift mechanism 302 identifies its new value, thus protecting the shift mechanism circuit 302 from false edge detection. The IDB field being "000" identifies that the clock input is expected to be stable for one cycle. The IDB field being "000" identifies that the clock input is expected to be stable for one cycle. The IDB field being "000" identifies that the clock input is expected to be stable for one cycle. The IDB field being "001" identifies that the clock input is expected to be stable for two cycles. The IDB field being "010" identifies that the clock input is expected to be stable for four cycles. The IDB field being "011" identifies that the clock input is expected to be stable for eight cycles. The IDB field being "100" identifies that the clock input is expected to be stable for sixteen cycles. The IDB field being "101" identifies that the clock input is expected to be stable for thirty two cycles.

When the WPUEN field (weak pull up enable) is set, the internal pullup (Q3) of the output buffer is enabled. That is, the internal pullup (Q3) is active when the buffer does not drive the PSDAT signal to the low level.

Figure 10:
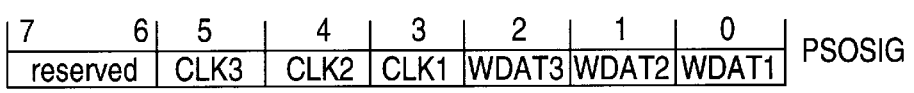
FIG. 10 illustrates the PSOSIG register.
Figure 11:
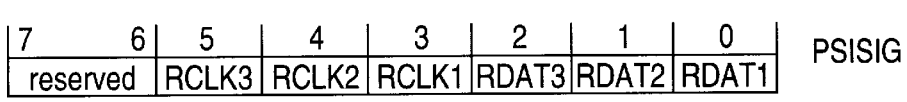
FIG. 11 illustrates the PSISIG register.

FIG. 10 illustrates the PSOSIG register, which is a byte wide, read/write register that allows the setting the value of the PS/2 interface circuit 300 port signals. When the shift mechanism circuit 302 is enabled, the clock control bits of the PSOSIG register determine the active channel(s). On reset, the non-reserved bits of the PSOSIG register are set to $07_{16}$.

The WDAT1 field (Write Data signal Channel 1) controls the data output to channel 1 data signal (PSDAT1). When the shift mechanism circuit 302 is disabled (PSCON.EN=0), the data in WDAT1 is output to PSDAT1. If WDAT1 is cleared, the output buffered data is 0 (i.e., PSDAT1 is forced low). If WDAT1 is set, the output buffer data is 1 (i.e., PSDAT1 is pulled high by the internal pull-up (Q3) and may be pulled low by an external device.

When the shift mechanism circuit 302 is enabled (EN=1), the WDAT1 field should be set to 1 except when the shift mechanism circuit 302 is in transmit mode. In this case, when in the transmit-inactive and it is intended to transmit data to channel 1, the controller 101 (executing the firmware 102), should clear the WDAT1 field to force the transmit signalling low to the PS/2 device. A WDAT2 and WDAT3 field are provided for Channel 2 and Channel 3, respectively.

The CLK1 field of the PSOSIG register, when cleared, forces a low on the PSCLK1 pin and thus disables channel 1 of the shift mechanism circuit 302. A CLK2 and CLK3 field are provided for Channel 2 and Channel 3, respectively.

The PSISIG register is shown in FIG. 11. The RSDAT1 field indicates the current value of the channel 1 data signal (PSDAT1). The RSDAT2 and RSDAT3 fields indicate the current values of the channel 2 and channel 3 data signals, respectively.

The RCLK1 field indicates the current value of the channel 1 clock signal (PSCLK1). The RCLK2 and RCLK3 fields indicate the current values of the channel 2 and channel 3 clock signals, respectively.

Figure 12:
FIG. 12 illustrates the PSIEN register.

FIG. 12 illustrates the PSIEN register, which is an 8-bit read/write register that enables/disables the various interrupts generated by the PS/2 interface circuit 300. The SOTIE (start of transmission interrupt enable) field, when set, enables the interrupt generation of a transaction start detection. The EOTIE (end of transaction interrupt enable) field is used to enable interrupt generation upon end of transaction detection. Finally, the DSNIE (disabled shift mechanism interrupt enable) field is used to enable interrupt generation when the shift mechanism circuit 302 is disabled to allow the controller 101, executing the firmware 102, to directly control the bitlevel functions of the PS/2 interface.

Having described the registers, the operation of the shift mechanism 302 is now described with reference to the register descriptions and to the FIG. 6 state machine. PS/2 packets can be transferred with either the shift mechanism 302 disabled or with the shift mechanism 302 enabled. The shift mechanism 302 is disabled when PSCON.EN is clear (0). In this state, the PS/2 clock and data signals are controlled by the processor 101 executing the firmware 102 and are not affected by the shift mechanism 302. This allows the firmware to perform the PS/2 protocol by manipulating the PS/2 clock and data signals, as done in previous generation keyboard controllers. In this "firmware" mode, the PS/2 packet transfer may be interrupted as a result of the host processor issuing FORCE-A20 or RESET-CPU host commands.

In the "firmware mode", the processor 101 employs the CLK1, CLK2 and CLK3 bits in PSOSIG registers to control the value of the respective clock signals (PSCLK1, PSCLK2 and PSCLK3). When cleared (0), the clock signal output is held low. When set (1), the open drain clock signal output is open and the respective clock signal is held high by the pull-up Q3. In this case, an external device may force the respective clock signal low. When reading the PSISIG register, bits RCLK1, RCLK2 and RCLK3 indicate the current value of the respective clock signal.

The WDAT1, WDAT2 and WDAT3 bits in PSOSIG register control the value of the respective data signals (PSDAT1, PSDAT2 and PSDAT3). When cleared (0), the respective data signal is held low. When set, the open drain output is open and the respective data signal is held high by the pull-up Q3. In this case, an external device may force the respective data signal low. When reading the PSISIG, register bits RDAT1, RDAT2 and RDAT3 indicate the current value of the respective data signal.

When PSIEN.DSNIE bit is set (1), the clock input signals are connected to an Interrupt Control Unit (ICU) for an interrupt driven PS/2 protocol. The three interrupts that are generated are PSINT1, PSINT2 and PSINT3 for channels 1, 2 and 3, respectively. The ICU should be programmed to detect a falling edge on each of the clock signals. Disabling a channel by writing 0 to the clock control signals (CLK1, CLK2 or CLK3) may cause a falling edge on a clock signal. When such an interrupt is not desired, clear (0) the clock control bit and then the pending bit in the ICU. This should be done while interrupts are disabled.

As discussed above, the shift mechanism 302 (when enabled) offloads the bit level handling of the PS/2 packet data transfer from the processor 101 executing firmware 102 to a hardware scheme that does not involve the processor 101. This improves tolerance of the system 100 to interrupt latency. As discussed above, the shift mechanism 302 includes a shift register 104, and a state machine 106 that controls the PS/2 protocol. FIG. 6 illustrates the data transfer sequence.

There are three basic modes of the state machine 106: disabled, receive mode and transmit mode. Different states in each mode define the progress of the data transfer. To reset the shift mechanism 302, the processor 101 clears either the shift mechanism enable bit (PSCON.EN=0) or all the clock bits (CLK1, CLK2 and CLK3=0) of each channel. In this state, the PSTAT register is cleared ($00_{16}$), and the shift-mechanism sets its clock and data lines (CLKO1, CLKO2, CLKO3, DATO1, DATO2 and DATO3) high (1). The state of the PS/2 clock and data signals (PSCLK1, PSCLK2, PSCLK3, PSDAT1, PSDAT2 and PSDAT3) is set according to the value of their control bits (CLK1, CLK2, CLK3, WDAT1, WDAT2 and WDAT3, respectively). When the processor 101 resets the shift mechanism 302 when the shift mechanism 302 is in either an unknown state or in the Transmit Idle state, the processor should set (1) WDAT1, WDAT2 and WDAT3 before the hardware circuitry 104 is reset. Before disabling the hardware circuitry 104, the processor 104 should clear (0) CLK1, CLK2 and CLK3, to prevent glitches on the clock signals.

To enable the shift mechanism 302, the processor 101 should verify that PSOSIG is set to $07_{16}$ and then set (1) PSCON.EN bit. This puts the state-machine 106 in the Receive Inactive or Transmit Inactive states (PSCON.XMT be 0 or 1 respectively). In this state, the clock signals (PSCLK1, PSCLK2 and PSCLK3) are low and the data signals are pulled high (PSDAT1, PSDAT2 and PSDAT3).

When the shift mechanism 302 is enabled, the PSTAT register indicates the current state of the shift mechanism 302. The data transfer process may be in one of the following three states: Receive Inactive, Receive Idle, Transmit Inactive or Transmit Idle states. The PSTAT is cleared because none of the enabled devices has sent a start bit.

When a start bit is detected, the shift mechanism 302 goes into either a Receive Active or Transmit Active state. This indicates that a start bit was identified for at least one of the channels and that a shift process has begun. The PSTAT.SOT indicates the detection of the start bit and the PSTAT.ACH field indicates that active channel. At this point, an interrupt to the processor 101 is generated and, in response, the processor initiates a timeout timer (the TIMERS & PWM block shown in FIG. 1-4).

When the shift mechanism 302 is at the "End-of-Reception" or "End-of-Transmission" state, this indicates either that the last bit (i.e., "stop bit") of the transfer sequence was detected and the data can be read from PSDAT register, or that the data transmission was completed (for receive and transmit modes, respectively). An interrupt is generated to the processor 101 in response to which the processor disables the timeout timer. The PSTAT.EOT indicates the transfer completion. The PSTAT.PERR being set indicates a parity error.

The PSINT1 is the interrupt signal generated by the shift mechanism 302 to allow interrupt driven interface with the processor 101. The ICU should be programmed to detect high level interrupts on the PSINT1 interrupt. The PSIEN.SOT1E and PSIEN.EOTIE mask the interrupt signaling for the PSTAT.SOT and PSTAT.EOT bits respectively.

After enabling the shift mechanism with PSCON.XMT= 0, the shift mechanism 302 enters the receive mode in the Receive Inactive state. The Receive Idle state can then be entered by enabling one (or more) of the channels, through setting the channel enable bit (CLK1, CLK2 and/or CLK3 for channel 1, 2 and/or 3, respectively). In the Receive Idle state, the shift mechanism 302 sets the clock and data lines of the enabled channels high (1) and waits for a start bit. In the Receive Idle state, the shift mechanism 302 waits for input from any one of the enabled channels. The first of the enabled channels to send a start bit is selected for handling by the shift mechanism 302. The other two channels are disabled by forcing "0" on their clock lines.

The start bit is identified by a falling edge on the clock signal while the data signal is low (0). If the start bit is identified simultaneously in more then one channel, one channel is selected for receive, while the transfer is aborted on the other channels on which a start bit is identified. The channel with the lower number is selected (i.e., channel 1 has priority over channels 2 and 3, and channel 2 has priority over channel 3). The data transfer in the other channels is aborted before 10 data bits have been sent (by forcing the clock signal to 0), therefore the transmitting PS/2 device re-sends its data once its interface is enabled again by the processor 101. This mechanism ensures that no incoming data is lost.

Setting (1) the SOT bit and designating the selected channel in the ACH field indicates receipt of the start bit in the PSTAT register. In addition, if PSIEN.SOTIE is set, an interrupt signal to the ICU is set high. As discussed above, the processor 101 may use this interrupt to start a time-out timer for the data transfer.

After identifying the start bit, the shift mechanism 302 enters the "Receive-Active" state. In this state the clock signal of the selected device (PSCLK1, PSCLK2 or PSCLK3) sets the data bit rate. On each falling edge of the clock, new data is sampled on the data signal of the active channel (i.e., PSDAT1, PSDAT2 or PSDAT3). Following the start bit, 8 bits of data are received (clocks 2 through 9), then a parity bit (10th clock) and a stop bit (11th clock). The stop bit is indicated by a falling edge of the clock with the data signal high (1). In case the 11th clock is identified with data low, the receive frame error bit (PSTAT.RFERR) is set, but the clock is treated as the STOP bit.

After the parity bit is received, the shift mechanism 302 checks the incoming data for parity error. If the number of bits with a value of 1 in the 8 data bits and the parity bit is even, then the PSCON.PERR is set indicating a parity error.

When the stop-bit is detected, the shift mechanism 302 enters the "End-Of-Reception" state. In this state, the shift mechanism 302 disables all the clock signals by forcing them to low; sets the End-Of-Transaction status bit (PSTAT.EOT=1); and, if PSTAT.EOTIE is set, asserts (1) the interrupt signal to the ICU. The shift mechanism remains in the End-of-Reception state until being reset. If the receive operation does not complete within the timeout period of the timer (typically 2 ms), then the timer will time out and generate an interrupt to the processor 101. The timer interrupt is not shown in the figures. The processor 101 will use this timeout to reset the PS/2 bus.

For transmission, after enabling the shift mechanism with PSCON.XMT set (1), the shift mechanism enters the transmit mode in the Transmit Inactive state, with all clock signals low and data signals high (PSOSIG=$07_{16}$). At this time, the processor 101 writes the data to be transmitted to the PS/2 data register (PSDAT). Then, the data line of the channel to be transmitted is forced low by the processor 101 clearing the data bit (WDAT1, WDAT2 or WDAT3 for channels 1, 2 or 3, respectively).

The Transmit Idle state can be entered by setting the channel enable bit (CLK1, CLK2 or CLK3 for channel 1, 2 and/or 3, respectively) to enable the channel to transmit. In this state, the shift mechanism 302 sets the clock of the enabled channels high (1) while the data line of that channel is held low and is waiting for a start bit. When a PS/2 device senses the clock signal is high with the data signal low, and identifies a transmit request from the controller. The other two channels are disabled by forcing "0" on their clock lines.

The start bit is identified by the shift mechanism 302 by a falling edge on the clock signal while the data signal is low (0). When a start bit is detected, the shift mechanism 302 begins data transmission by outputting bit-0 (LSB) of the transmitted data and setting one of the data bits WDAT1, WDAT2 or WDAT3 in the PSOSIG register. This allows bit-0 of the transmitted data to be output on the PS/2 data signal (PSDAT1, PSDAT2 or PSDAT3, according to the active channel).

The shift mechanism 302 indicates receipt of the start bit by setting (1) the SOT bit and storing the active channel number in the ACH field of the PSTAT register. When the start bit is detected, WDAT0, WDAT1 and WDAT2 are all set (1). In addition, if PSIEN.SOTIE is set, then the shift mechanism set an interrupt signal to the ICU to high. As with the Receive mode, the processor 101 may use this interrupt to start a time-out timer for the data transfer.

After identifying the start bit, the shift mechanism 302 enters the Transmit-Active state. At this point, a timeout timer is initiated. The clock signal of the selected device (PSCLK1, PSCLK2 or PSCLK3) sets the data bit rate. After each of the next seven falling edges of the clock line, one more data bit (bits 1 through 7) is put on the data line of the active channel (either PSDAT1, PSDAT2 or PSDAT3). On the ninth falling edge of the clock, the parity bit is output. The parity bit is high (1) if the number of bits with a value of 1 in the transmitted data was even (i.e., odd parity). The tenth falling edge causes '1' to be output as a stop bit. The data signal remains high to allow the PS/2 device to send the line control bit. The auxiliary device then completes the transfer by sending the line-control bit. The line-control bit, is identified by the data signal being low after the 11th falling edge of the clock.

The shift mechanism 302 enters the End-Of-Transmission state in response to detecting the line-control bit. In response, the shift mechanism 302 holds all clock signals low and all data signals are pulled high by the internal pull-up. The shift mechanism 302 sets the End-Of-Transaction flag (PSTAT.EOT) to indicate that the transmit operation was completed and, if the PSIEN.EOTIE bit is set, the shift mechanism 302 sets the interrupt signal to the ICU to high. The shift mechanism stays in the End-Of-Transmission state until being reset. If the receive operation does not complete with the timeout period of the timer, then the timer will time out and generate an interrupt to the processor 101.

At each stage of a receive or transmit operation, the shift mechanism can abort the operation by clearing all three channel enable bits (CLK1–3) in the shifter control register (PSOSIG) to 0. This resets the shifter state-machine and puts it in the "enabled-inactive" state. If the shift mechanism is in Transmit Inactive or Transmit Idle states, the WDAT1, WDAT2 and WDAT3 bits should also be set.

It should be understood that various alternatives to the embodiments of the invention described herein may be employed in practicing the invention. It is intended that the following claims define the scope of the invention and that methods and apparatus within the scope of these claims and their equivalents be covered thereby. For example, an $I^2C$ or other protocol interface may be provided for handling communication to external devices, with similar benefits being derived, namely that this communication can be handled without intervention from the controller processor 101 so that handling of the FORCE-A20 and RESET-CPU host commands by the controller processor 101 do not interrupt this communication.

The Appendix to this application describes an integrated circuit implementation in greater detail. The Appendix is to be considered an integral part of this patent application.

What is claimed is:

1. An interface circuit that interfaces a host processor to a serial device for input/output functions and that also handles host commands including one of a GA20 and RESET-CPU host commands from a host processor, the interface circuit comprising:
host interface circuitry via which the host commands are received from the host processor;
serial device interface circuitry including:
storage circuitry that holds a predetermined plurality of data bits; and
state machine circuitry that controls the storage circuitry for serial bit-level communication of the plurality of data bits between the storage circuitry and the serial device;
a command processor that processes the host commands received from the host processor via the host interface circuitry, including the one of the GA20 and RESET-CPU host commands, and that selectively asserts one of a GA20 or RESET-CPU signal, respectively, to the host processor, based on the processed received host command, wherein the serial device interface circuitry operates without being interrupted by the command processor.

2. The interface circuit of claim 1, wherein the interface circuit is formed unitarily in an integrated circuit.

3. The interface circuit of claim 1, wherein the command processor operates based on processor instructions retrieved from a program memory, and the program memory is formed in a first integrated circuit and the remainder of the interface circuit is formed in a second integrated circuit different from the first integrated circuit.

4. The interface circuit of claim 1, wherein the state machine circuitry controls the storage circuitry for serial communication with the serial device in accordance with a PS/2 protocol.

5. The interface circuit of claim 1, wherein the state machine circuitry is operable in:
a first mode to control the storage circuitry for receiving data bits from the serial device; and
a second mode to control the storage circuitry for transmitting data bits to the serial device.

6. The interface circuit of claim 1, wherein the processor readable program code detects and processes the GA20 command and the RESET-CPU command before detecting and processing any other host command.

7. The interface circuit of claim 1, wherein the storage circuitry comprises a shift register.

8. The interface circuit of claim 1, wherein the processing of certain ones of the host commands, other than the GA20 and RESET-CPU host commands, causes the command processor to interrupt the operation of the serial device interface circuitry.

9. The interface circuit of claim 5, wherein the host commands include a first plurality of host commands that require the interface circuit to communicate with the serial device and a second plurality of host commands, including the GA20 and RESET-CPU host commands, that do not require the interface circuit to transmit a message to the serial device, wherein the interface circuit further includes:
a program memory having embodied therein processor-readable program code that causes the command processor to detect whether the host command is one of the first plurality of host commands and, if the host command is one of the first plurality of host commands, disables the serial device interface circuitry from operating the state machine in the first mode, controls the serial device interface circuitry to operate the state machine in the second mode to transmit a command message to the serial device, and then enables the serial device interface circuitry to operate the state machine in the first mode.

10. The interface circuit of claim 7, wherein the state machine circuitry is operable in:
a first mode to control the shift register for shifting data bits into the shift register, from the serial device; and
a second mode to control the storage circuitry for shifting data bits out of the shift register, to the serial device.

11. The interface circuit of claim 10, wherein the state machine, in both the first mode and the second mode, controls the storage circuitry for serial communication with the serial device in accordance with a PS/2 protocol.

12. An interface circuit that handles host commands received from a host processor and that interfaces the host processor to a serial device, the interface circuit comprising:
a command processor that detects GA20 commands provided by the host processor and that acts upon a GA20 hardware signal to the host processor in response thereto;
storage circuitry that holds a predetermined plurality of data bits;
state machine circuitry that controls the storage circuitry for serial bit-level communication of the plurality of data bits between the storage circuitry and the serial device without intervention from the command processor.

13. The interface circuit of claim 12, wherein the state machine circuitry controls the storage circuitry for serial communication with the serial device in accordance with a PS/2 protocol.

14. The interface circuit of claim 12, wherein the state machine circuitry is operable in:
a first mode to control the storage circuitry for receiving data bits from the serial device; and
a second mode to control the storage circuitry for transmitting data bits to the serial device.

15. The interface circuit of claim 12, wherein the host commands include a RESET-CPU command in addition to the GA20 command.

16. The interface circuit of claim 12, wherein the storage circuitry comprises a shift register.

17. The interface circuit of claim 15, wherein the command processor operates in response to processor readable program code to detect and act upon the GA20 command and the RESET-CPU command before detecting and handling any other host command.

18. The interface circuit of claim 16, wherein the state machine circuitry is operable in:

a first mode to control the shift register for shifting data bits into the shift register, from the serial device; and a second mode to control the storage circuitry for shifting data bits out of the shift register, to the serial device.

19. The interface circuit of claim 18, wherein the state machine, in both the first mode and the second mode, controls the storage circuitry for serial communication with the serial device in accordance with a PS/2 protocol.

20. A device controller that interfaces a host processor to a serial device and also handles at least one of a GA20 host command and a RESET-CPU host command provided from a host processor, the device controller comprising:

serial device interface circuitry including:

storage circuitry that holds a predetermined plurality of data bits; and state machine circuitry that controls the storage circuitry for serial bit-level communication of the plurality of data bits between the storage circuitry and the serial device;

a controller command processor that processes the at least one of the GA20 host and the RESET-CPU host command provided from the host processor, wherein the serial device interface circuitry operates without being interrupted by the processing of the at least one of the GA20 host command and the RESET-CPU host command by asserting a GA20 signal if the host command is a GA20 host command or asserting a RESET-CPU signal if the host command is a RESET-CPU host command.

21. The device controller of claim 20, wherein the device controller is formed unitarily in an integrated circuit.

22. The device controller of claim 20, wherein a program memory for the controller command processor is formed in a first integrated circuit and the remainder of the device controller is formed in a second integrated circuit different from the first integrated circuit.

23. The device controller of claim 20, wherein the state machine circuitry controls the storage circuitry for serial communication with the serial device in accordance with a PS/2 protocol.

24. The device controller of claim 20, wherein the state machine circuitry is operable in:

a first mode to control the storage circuitry for receiving data bits from the serial device; and a second mode to control the storage circuitry for transmitting data bits to the serial device.

25. The device controller of claim 20, wherein the processing of certain ones of the host commands, other than the GA20 and RESET-CPU host commands, causes the command processor to interrupt the operation of the serial device interface circuitry.

* * * * *